(12) United States Patent
Welcher et al.

(10) Patent No.: US 9,679,273 B2
(45) Date of Patent: Jun. 13, 2017

(54) METHOD, SYSTEM AND COMMUNICATION DEVICE FOR GENERATING NOTIFICATION SIGNALS

(71) Applicant: Research In Motion Limited, Waterloo (CA)

(72) Inventors: Hayward Ivan Craig Welcher, Kitchener (CA); Daryl Joseph Martin, Kitchener (CA)

(73) Assignee: BLACKBERRY LIMITED, Waterloo (CA)

( * ) Notice: Subject to any disclaimer, the term of this patent is extended or adjusted under 35 U.S.C. 154(b) by 368 days.

(21) Appl. No.: 13/658,892

(22) Filed: Oct. 24, 2012

(65) Prior Publication Data

US 2014/0115072 A1    Apr. 24, 2014

(51) Int. Cl.
*G06F 15/16* (2006.01)
*G06Q 10/10* (2012.01)
*H04L 12/58* (2006.01)

(52) U.S. Cl.
CPC .......... *G06Q 10/107* (2013.01); *H04L 51/18* (2013.01); *H04L 51/24* (2013.01)

(58) Field of Classification Search
CPC ........ G06Q 10/107; H04L 51/18; H04L 51/24
USPC .................................. 709/209, 227
See application file for complete search history.

(56) References Cited

U.S. PATENT DOCUMENTS

| | | | |
|---|---|---|---|
| 8,169,856 B2 * | 5/2012 | Rai et al. | 368/46 |
| 8,199,695 B2 | 6/2012 | de Araujo et al. | |
| 2007/0265038 A1 | 11/2007 | Kim | |
| 2009/0007143 A1 * | 1/2009 | Chang | G06Q 10/107 719/318 |
| 2009/0092060 A1 * | 4/2009 | Goto | 370/254 |
| 2009/0163244 A1 * | 6/2009 | Parkkinen et al. | 455/558 |
| 2010/0117850 A1 * | 5/2010 | McCaslin | G08B 5/36 340/815.4 |
| 2011/0255546 A1 * | 10/2011 | Le Pallec | H04J 3/0679 370/400 |
| 2012/0092130 A1 | 4/2012 | Chung et al. | |

(Continued)

OTHER PUBLICATIONS iOS Hands-On: Apple Clears Away Redundant Notifications (article) Downloaded from http://applenapps.com/special-event/ios-6-hands-on-apple-clears-away-redundant-notifications.html Publication Date: Jun. 12, 2012 http://www.youtube.com/watch?v=Ka_UTM69Ynl&feature=player_detailpage.

(Continued)

*Primary Examiner* — Bryan Lee
*Assistant Examiner* — Oluwatosin Gidado
(74) *Attorney, Agent, or Firm* — Perry + Currier Inc.

(57) ABSTRACT

According to embodiments described in the specification, a method, system and apparatus for generating notification signals are provided. The method includes storing an identifier of a slave device in a memory of a master device; detecting, at a processor interconnected with the memory, a notification message via execution of a notification application; in response to detecting the notification message, retrieving the slave device identifier and transmitting an instruction message to the slave device, the instruction message including an identifier of the notification message and an alert parameter; and generating an alert via an output device interconnected with the processor according to the alert parameter.

19 Claims, 7 Drawing Sheets

(56) References Cited

U.S. PATENT DOCUMENTS

| 2013/0210340 A1* | 8/2013 | Pharn | H04N 21/814 |
| | | | 455/3.01 |
| 2015/0170496 A1* | 6/2015 | King | G08B 21/24 |
| | | | 340/686.6 |

OTHER PUBLICATIONS

Corresponding European Patent Application No. 12189822.5 Search Report dated Apr. 4, 2013.

* cited by examiner

METHOD, SYSTEM AND COMMUNICATION DEVICE FOR GENERATING NOTIFICATION SIGNALS

FIELD

The specification relates generally to communication devices, and specifically to a method, system and communication device for generating notification signals.

BACKGROUND

Multiple communication devices (e.g. smart phones, laptop computers, tablet computers and the like) can be associated with the same account, such as an email account. Such communication devices can be configured to generate various alerts in response to new emails. The generation of alerts for the same email at multiple devices can lead to inefficient use of device resources.

BRIEF DESCRIPTIONS OF THE DRAWINGS

Embodiments are described with reference to the following figures, in which.

DETAILED DESCRIPTION OF THE EMBODIMENTS

An aspect of the specification provides a method, comprising: storing an identifier of a slave device in a memory of a master device; detecting, at a processor interconnected with the memory, a notification message via execution of a notification application; in response to detecting the notification message, retrieving the slave device identifier and transmitting an instruction message to the slave device, the instruction message including an identifier of the notification message and an alert parameter; and generating an alert via an output device interconnected with the processor according to the alert parameter.

Another aspect of the specification provides a non-transitory computer readable medium storing computer readable instructions executable by a processor of a master communication device for implementing the above method.

Another aspect of the specification provides a method, comprising: receiving, at a processor of a slave device from a master device, an instruction message including a notification identifier and an alert parameter; determining whether the notification identifier matches any notification messages stored in a memory interconnected with the processor; and when the determination is affirmative, generating an alert according to the alert parameter.

Another aspect of the specification provides a non-transitory computer readable medium storing computer readable instructions executable by a processor of a master communication device for implementing the above method.

Another aspect of the specification provides a communication device, comprising: a memory for storing an identifier of a slave device, and a notification application; an output device; a processor interconnected with the memory and the output device; the processor configured to: detect a notification message via execution of the notification application; in response to detecting the notification message, retrieve the slave device identifier and transmit an instruction message to the slave device, the instruction message including an identifier of the notification message and an alert parameter; and generate an alert via the output device according to the alert parameter.

Another aspect of the specification provides a communication device, comprising: a memory for storing one or more notification messages; an output device; a processor interconnected with the memory and the output device, the processor configured to: receive, from a master device, an instruction message including a notification identifier and an alert parameter; determine whether the notification identifier matches any of the notification messages stored in the memory; and when the determination is affirmative, generate an alert via the output device according to the alert parameter.

Figure 1:
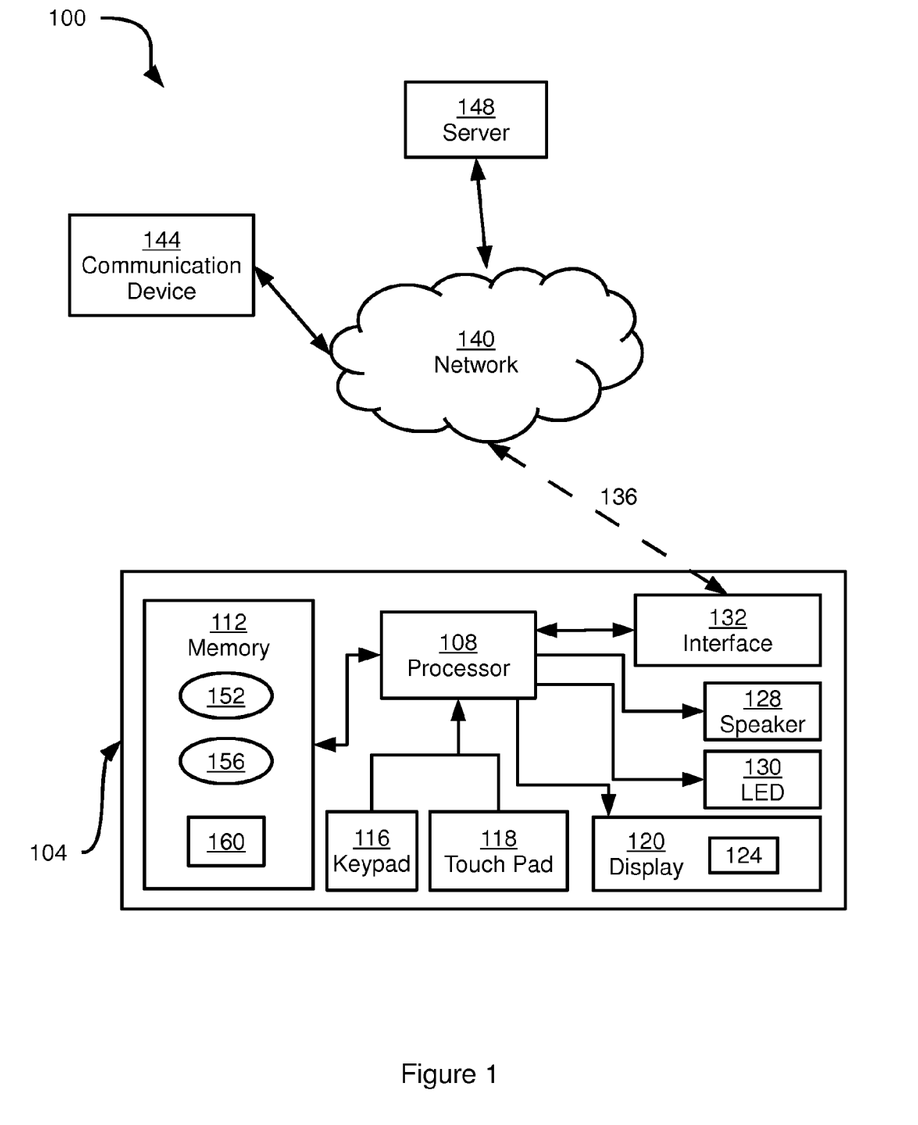
FIG. 1 depicts a communications system, according to a non-limiting embodiment.

FIG. 1 depicts a communications system 100. System 100 includes a communication device 104, which in the present example is based on the computing environment and functionality of a hand-held wireless communication device. Communication device 104 is not limited to a hand-held wireless communication device, however. Other devices are also contemplated, such as cellular telephones, smart telephones, Personal Digital Assistants ("PDAs"), media (e.g. MP3) players, laptop computers, tablet computers and the like. In other examples, communication device 104 can be substituted by a computing device such as a desktop computer.

Communication device 104 includes a processor 108 interconnected with a non-transitory computer readable storage medium such as a memory 112. Memory 112 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. In the present example, memory 112 includes both a volatile memory and a non-volatile memory. Other types of non-transitory computer readable storage medium are also contemplated, such as compact discs (CD-ROM, CD-RW) and digital video discs (DVD).

Communication device 104 also includes one or more input devices interconnected with processor 108. Such input devices are configured to receive input and provide data representative of such input to processor 108. Input devices can include, for example, a keypad 116 and a touch pad 118. Thus, keypad 116 can receive input in the form of the depression of one or more keys, and can then provide data representative of such input to processor 108. The data provided to processor 108 can be, for example, an American Standard Code for Information Interchange (ASCII) value for each of the depressed keys. Keypad 116 can be a full QWERTY keypad, a reduced QWERTY keypad or any other suitable arrangement of keys. Touch pad 118 can receive input in the form of depression of touch pad 118 or swipe gestures along the surface of touch pad 118, and can then provide data representative of such input to processor 108 in the form of, for example, coordinates representing the location of a virtual cursor, the direction and/or velocity of a swipe gesture, and the like.

In some examples, communication device 104 can include additional input devices in the form of one or more microphones, buttons, light sensors and the like (not shown). More generally, any suitable combination of the above-mentioned input devices can be incorporated into communication device 104.

Communication device 104 further includes one or more output devices. The output devices of communication device 104 include a display 120. Display 120 includes display circuitry 124 controllable by processor 108 for generating interfaces which include representations of data and/or applications maintained in memory 112. Display 120 includes a flat panel display comprising any one of, or any suitable combination of, a Liquid Crystal Display (LCD), a plasma display, an Organic Light Emitting Diode (OLED) display, and the like. Circuitry 124 can thus include any suitable combination of display buffers, transistors, LCD cells, plasma cells, phosphors, LEDs and the like. When the input devices of communication device 104 include a touch screen input device, the touch screen (not shown) can be integrated with display 120.

The output devices of communication device 104 can also include a speaker 128 interconnected with processor 108. Additional output devices are also contemplated including, for example, a light-emitting indicator in the form of a Light-Emitting Diode (LED) 130, and a motor or other mechanical output device (not shown) for causing communication device 104 to vibrate. In general, communication device 104 can include any suitable combination of the above-mentioned output devices, and may also include other suitable output devices.

Communication device 104 also includes a communications interface 132 interconnected with processor 108. Communications interface 132 allows communication device 104 to communicate with other computing devices via a link 136 and a network 140. Network 140 can include any suitable combination of wired and/or wireless networks, including but not limited to a Wide Area Network (WAN) such as the Internet, a Local Area Network (LAN), cell phone networks, WiFi networks, WiMax networks and the like. Link 136 is compatible with network 140. In particular, link 136 can be a wireless link based on any of the Global System for Mobile communications (GSM), General Packet Radio Service (GPRS), Enhanced Data rates for GSM Evolution (EDGE), third and fourth-generation mobile communication system (3G and 4G), Institute of Electrical and Electronic Engineers (IEEE) 802.11 (WiFi) or other wireless protocols or standards. Link 136 can also include any base stations and backhaul links necessary to connect communication device 104 to network 140.

Communications interface 132 can also allow communication device 104 to communicate with other computing devices via a local link (not shown), such as a Bluetooth™ link.

Communications interface 132 is selected for compatibility with link 136 and network 140, as well as with local links such as Bluetooth™. Communications interface 132 thus includes one or more transmitter/receiver assemblies, or radios, and associated circuitry. For example, communications interface 132 can include a first assembly, or radio, for enabling communications over a WiFi network, and a second radio for enabling communications over one or more mobile telephone networks (e.g. 3G networks). In other embodiments, link 136 can be a wired link, such as an Ethernet link, and interface 132 can include suitable hardware for communicating over such a link.

Communication device 104 can receive communications from, and send communications to, other communication devices over link 136 and network 140. For example, system 100 can include a second communication device 144 and a server 148 connected with network 140 (as noted above, communication device 144 can also be connected to communication device 104 via a local link rather than, or in addition to, link 136 and network 140). The nature of communications between communication device 104 and other computing devices is not particularly limited, and can include, for example, telephone calls, emails, Short Message Service (SMS) messages, Instant Message (IM) messages, and the like.

The various components of communication device 104 are contained within a housing (not shown) comprising any suitable combination of materials (e.g. aluminum, plastics, and the like). The components of communication device 104 are interconnected via a communication bus (not shown). Communication device 104 can be powered by a battery (not shown) contained within the housing, though it will be understood that communication device 104 can also be supplied with electricity by a wired connection to a wall outlet or other power source, for example when docked. In other embodiments, where communication device 104 is in the form of a desktop computer for example, certain components need not be contained within the same housing. For example, display 120 can be housed separately from an enclosure housing processor 108 and memory 112. As a further example, keypad 116 can be replaced or supplemented by a keyboard which is housed separately from the enclosure housing processor 108 and memory 112.

Communication device 104 maintains, in memory 112, a plurality of computer readable instructions executable by processor 108. Such instructions can include, for example, an operating system and a variety of other applications. For example, as illustrated in FIG. 1, communication device 104 stores a notification application 152 and a messaging application 156, which in the present embodiment is an email application. As will be discussed in greater detail below, a notification hierarchy record 160 is also stored in memory 112.

When processor 108 executes the instructions of application 152 or 156, processor 108 is configured to perform various functions implemented by the computer readable instructions of the respective applications, as will be discussed below in greater detail. It is contemplated that memory 112 can store a variety of additional applications, such as a calendar application, a telephony application, a web browsing application, and the like (not shown). In the present example, it is contemplated that application 152 is a component of the operating system, though in other examples application 152 can be a separate, standalone application.

In general, processor 108 is configured, via the execution of application 156, to send and receive email messages associated with an account maintained by server 148. When a new message is received at processor 108 from server 148 via communication interface 132, processor 108 is configured, via the execution of notification application 152, to generate one or more notification signals (also referred to herein as alerts) by controlling the output devices of communication device 104. The alerts are external indications (e.g. to a user of device 104) that a new message has been received. It is contemplated that alerts can also be generated in response to activity in connection with other applications. For example, processor 108 can be configured to generate a reminder of a calendar appointment from a calendar application, and to generate an alert for the reminder using application 152.

It is contemplated that second communication device 144 includes components similar to those of communication device 104. More specifically, in the examples discussed below it is assumed that communication device 104 is a smart phone, while second communication device 144 is a tablet computer.

Communication devices 104 and 144 are associated with each other in that both devices execute email applications to send and receive email messages associated with the same account at server 148. For example, both devices 104 and 144 may be operated by the same user. Further, devices 104 and 144 are paired with each other via network 140 (or via a local link, as mentioned above) and have each has authenticated the identity of the other (i.e. the devices are trusted by one another). As will be discussed below, one of devices 104 and 144 can be configured as a master device, while the other can be configured as a slave device, and such configurations can be updated dynamically. Both devices 104 and 144 may be configured to generate alerts in response to the same email message received from server 148. As will be discussed below, devices 104 and 144 are configured to synchronize such alerts (that is, to generate the alerts using their respective output devices at substantially the same time).

Figure 2:
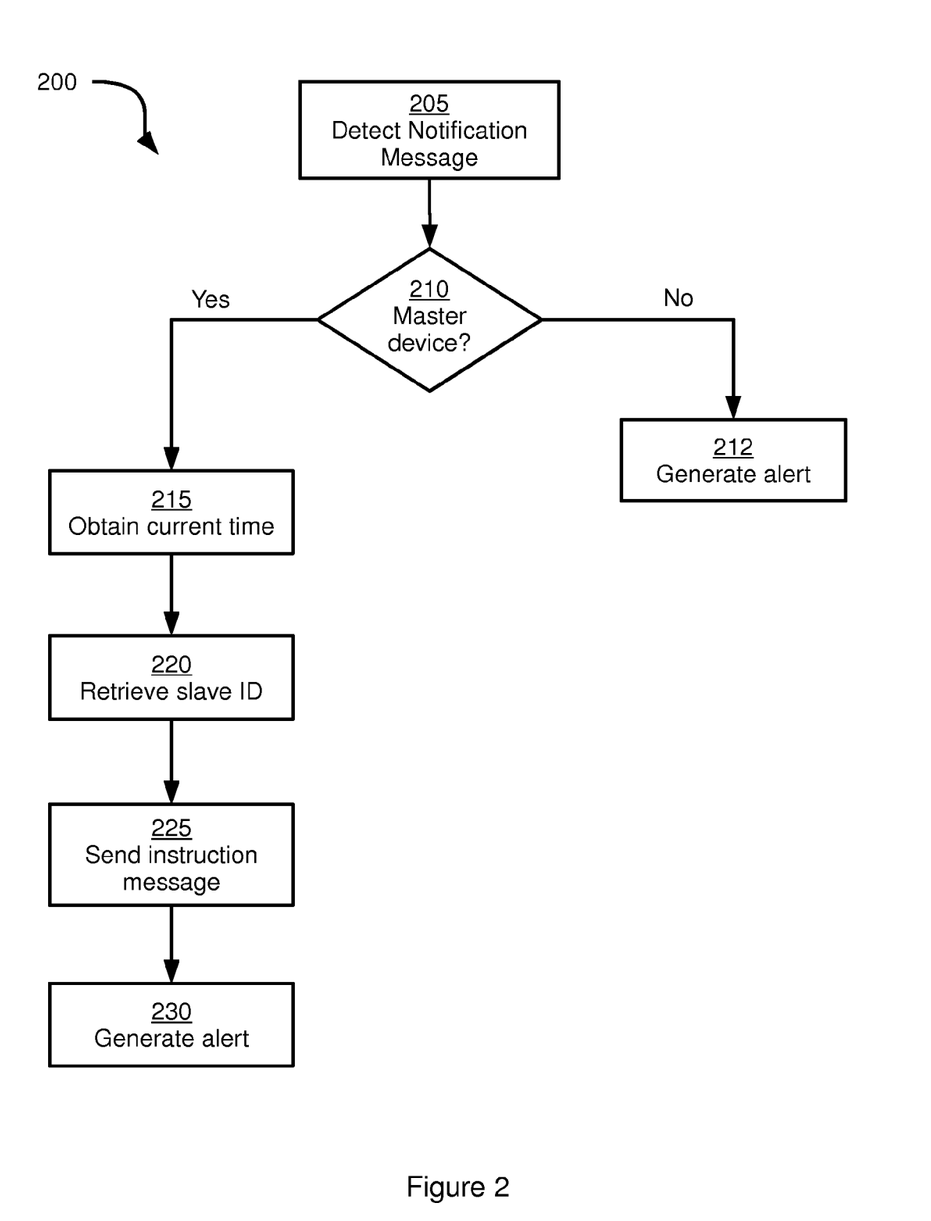
FIG. 2 depicts a method of generating alerts at a communication device in the system of FIG. 1, according to a non-limiting embodiment.

Turning now to FIG. 2, a flowchart illustrating a method 200 of generating notification signals at a communication device is shown. Method 200 will be discussed in conjunction with its performance on communication device 104, though it will now be appreciated that method 200 can also be performed as described below on communication device 144. The blocks of method 200 are implemented via the execution of notification application 152 by processor 108. In other words, processor 108, in conjunction with the other components of communication device 104, is configured to perform the various functions described below as a result of executing the computer-readable instructions of application 152.

Beginning at block 205, processor 108 is configured to detect a notification message. The nature of the notification message is not particularly limited. For example, a notification message can be previously generated by processor 108 itself via the execution of a calendar application, and can indicate that an appointment in a calendar at device 104 is approaching. As another example, a notification message can be received from server 148, indicating that a new email has been received at server 148 addressed to the account associated with device 104. The notification message can also be generated by processor 108 itself, via execution of application 156 when the email is received from server 148. As a further example, a notification message can be received from another communication device (such as device 144), informing device 104 of an upcoming calendar appointment, email, and the like. The notification message, once detected, can be stored in memory for a predetermined time period.

Figure 3:
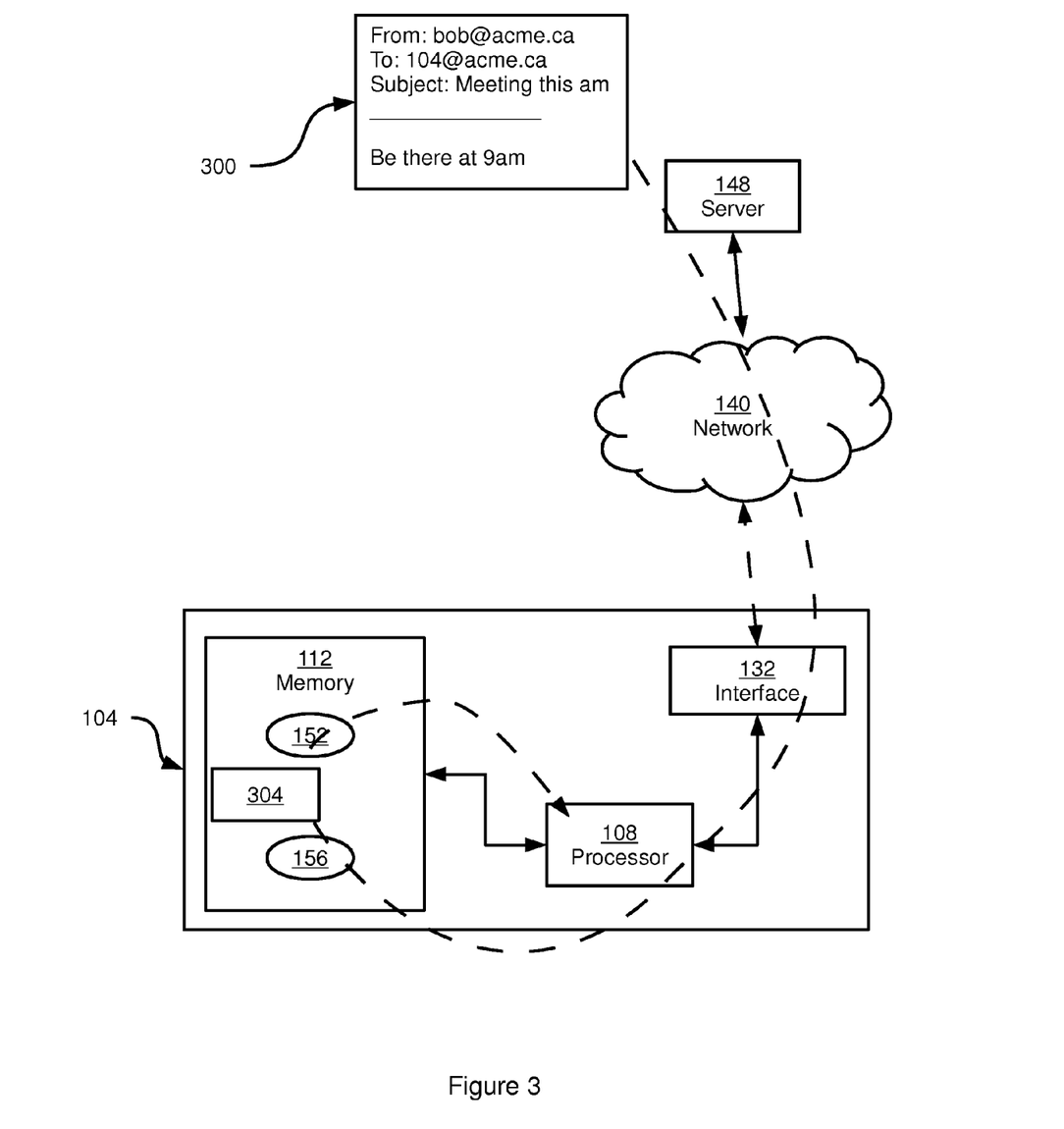
FIG. 3 depicts a performance of block 205 of the method of FIG. 2, according to a non-limiting embodiment.

In general, notification messages indicate that an event has occurred for which processor 108 is configured to generate an alert via one or more output devices. Therefore, the notification message includes data defining the event (e.g. a calendar appointment subject, an email subject line, and the like). In the present example, it will be assumed that the notification message detected at block 205 indicates that an email message has been received at device 104 from server 148. FIG. 3 depicts a schematic representation of block 205.

Referring to FIG. 3, in which certain components of device 104 have been omitted for greater visibility of the remaining components, an email message 300 (having sender and receiver addresses, a subject line and a body) is received at device 104 (particularly, at communications interface 132) from server 148. Via the execution of messaging application 156, processor 108 generates a notification message 304, which is detected by processor 108 via execution of notification application 152. In the present example, notification message 304 includes the subject line of email 300.

Returning to FIG. 2, proceeding to block 210, processor 108 is configured to determine whether device 104 is a "master" device. To perform the determination at block 210, processor 108 is configured to examine hierarchy record 160 to determine whether or not a flag indicating that device 104 is a master device is set. Briefly, if device 104 is a master device, processor 108 will be configured to perform additional actions in response to notification message 304, to influence the behaviour of other communication devices.

Figure 4:
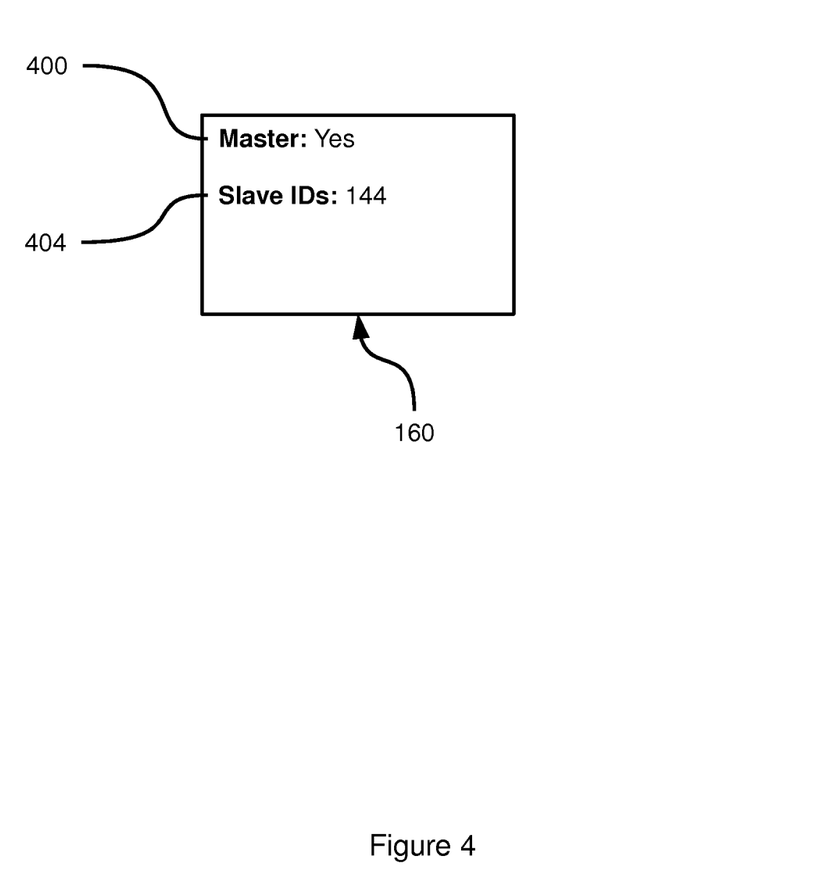
FIG. 4 depicts a hierarchy record stored by a communication device in the system of FIG. 1, according to a non-limiting embodiment.

Turning now to FIG. 4, an example hierarchy record 160 is shown. Hierarchy record 160 includes a flag 400 and one or more slave device identifiers 404 (which will be discussed in further detail below). The nature of flag 400 is not particularly limited. Although in the present example flag 400 can have the values "Yes" (as shown in FIG. 4) or "No", a wide variety of other values are contemplated. For example, flag 400 can have the values "1" (indicating that device 104 is a master device) or "0" (indicating that device 104 is not a master device). In another example, flag 400 can be replaced by a device identifier (e.g. a serial number, device PIN, MSISDN and the like), in which case the determination at block 210 is whether or not the master device identifier corresponds to device 104.

Returning to FIG. 2, when the determination at block 210 is negative (that is, when device 104 is not a master device), the performance of method 200 proceeds to block 212. At block 212, processor 108 is configured to control the output devices of device 104 to generate an alert according to alert settings (not shown) stored in memory 112. For example, the alert settings may cause processor 108 to flash LED 130 once every five seconds, for a period of sixty seconds. A wide variety of alert settings will now occur to those skilled in the art.

When the determination at block 210 is affirmative (that is, when device 104 is a master device), the performance of method 200 proceeds to block 215 instead of block 212. At block 215, processor 108 can be configured to obtain a current time, for example, from server 148 or another source accessible via network 140. The performance of block 215 can be omitted, however, as processor 108 maintains a current time locally.

Processor 108 is then configured, at block 220, to retrieve one or more slave device identifiers from hierarchy record 160. As seen above, in the present example only one slave device is identified in record 160 (communication device 144). The slave device identifiers can take a variety of forms, such as serial numbers, device PINs, MSISDNs, and the like.

Having retrieved the slave identifier at block 220, processor 108 is configured, at block 225, to generate and send an instruction message to each slave device whose identifier was retrieved at block 220 (that is, each device identified in record 160). The instruction message includes at least an identifier of the notification message received at block 205. The nature of the identifier is not particularly limited, and serves to uniquely identify the event to which the notification message relates. Thus, for the present example, where the notification message includes the subject line of email 300, the identifier included in the instruction message can be a unique representation such as a hash of the subject line. In other examples, the identifier can be the subject line itself, or a checksum of email 300.

In the present example, (although, as will be discussed later, this is not strictly necessary), the instruction message also includes a timestamp representing the current time maintained by processor 108 (which can be set based on a time retrieved at block 215). The timestamp is used by the receiving slave device to synchronize a clock maintained by the slave device with the current time maintained by processor 108. Such clock synchronization can include additional steps not shown in FIG. 2, as will now occur to those skilled in the art. For example, either or both of the slave device and device 104 (the master device) can be configured to measure a communication latency between the slave device and device 104, to allow the slave device to set its clock based on the timestamp and accounting for such latency.

Further, in the present example, the instruction message generated and sent at block 225 includes at least one alert parameter. Alert parameters can include a start time for an alert, and a frequency for an alert. Other example alert parameters include the name of an audio file containing a ring tone, or even the actual data defining the ring tone.

Figure 5:
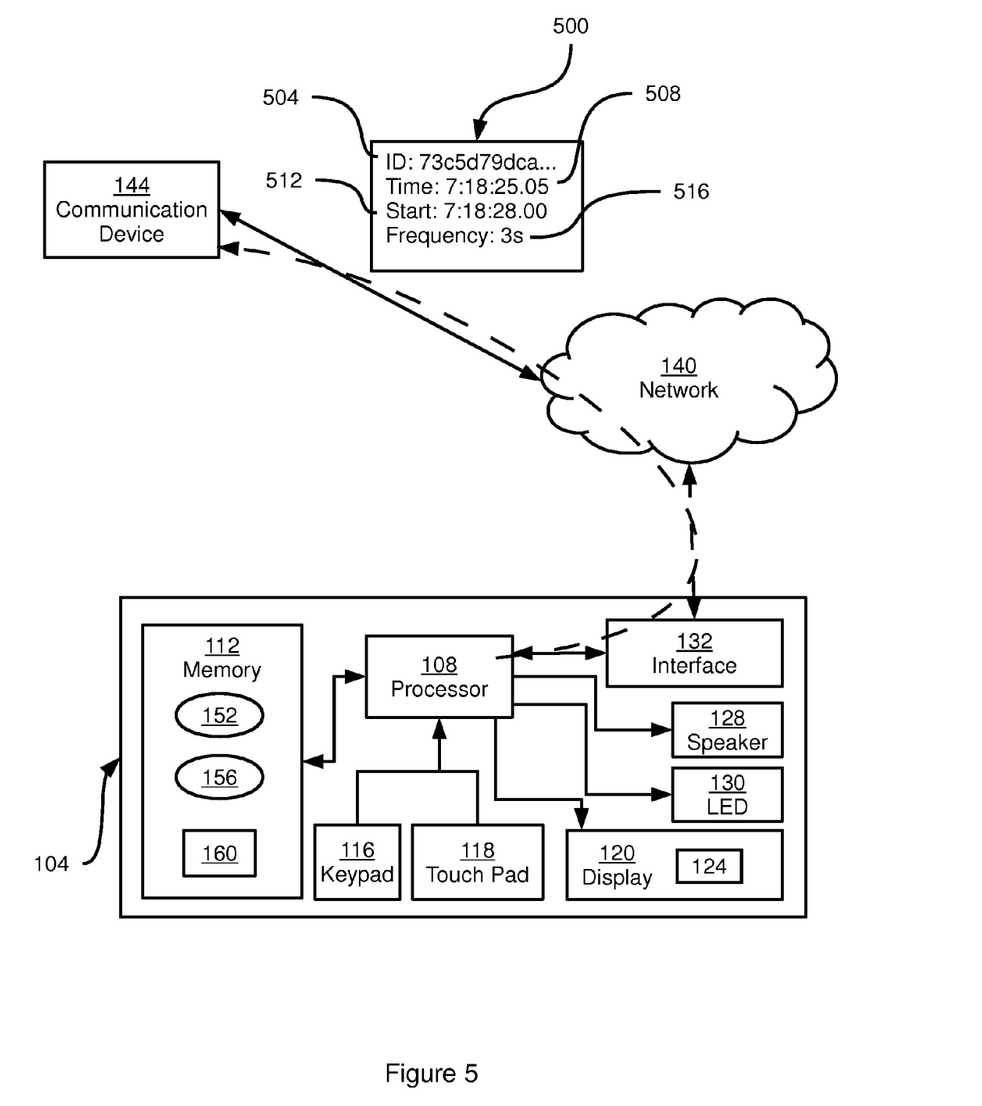
FIG. 5 depicts a performance of block 225 of the method of FIG. 2, according to a non-limiting embodiment.

Turning to FIG. 5, a schematic representation of the performance of block 225 is shown. In particular, an instruction message 500 generated by processor 108 is sent to device 144 via network 140. Instruction message 500 includes: a notification identifier 504 in the form of an MD5 hash of the subject line of email 300; a current timestamp 508 for clock synchronization between devices 104 and 144; and alert parameters in the form of a start timestamp 512 and a frequency 516.

Returning to FIG. 2, following the transmission of instruction message 500, at block 230 processor 108 is configured to control the output devices of device 104 to generate an alert for the notification message received at block 205, according to the alert parameters send to device 144. Thus, in the present example, processor 108 controls LED 130 to begin flashing once every three seconds, at the time 7:18:28. It is contemplated that the alert parameters correspond to the alert settings discussed above in connection with block 212.

Thus, in addition to generating an alert, the master device is also configured to send an instruction message to one or more slave devices for causing the slave devices to generate alerts according to the parameters specified in the instruction. As will be seen below, application 152 can also contain instructions for configuring processor 108 to receive and process instruction messages such as those sent at block 225. In other words, device 104 can act as both a master device and a slave device, with flag 400 being configurable via, for example, input received at keypad 116.

Figure 6:
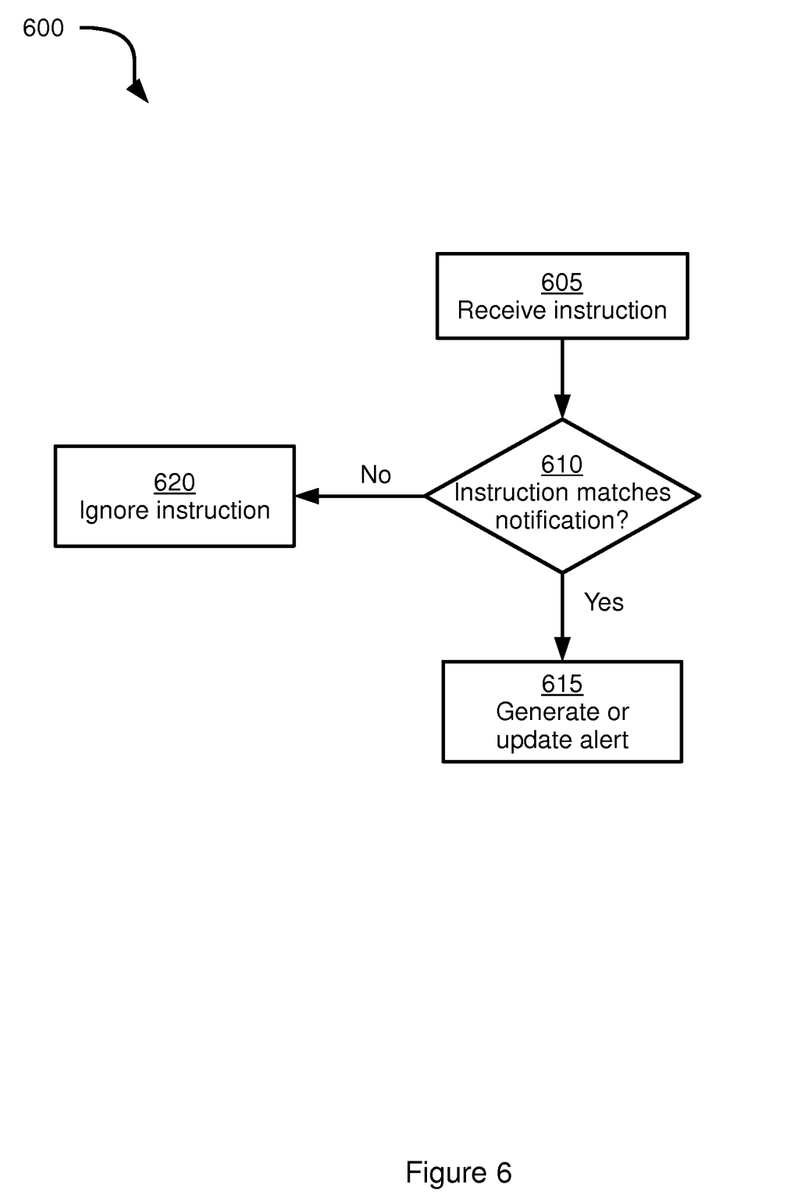
FIG. 6 depicts a further method of generating alerts at a communication device in the system of FIG. 1, according to a non-limiting embodiment.

Turning now to FIG. 6, a further method 600 is shown for generating alerts at a communication device. Method 600 is performed by devices such as device 104 and device 144, via execution of application 152, when an instruction such as that sent at block 225 of method 200 is received. Thus, method 600 is performed by slave devices (meaning those devices whose hierarchy records indicate that they are not master devices).

The present example performance of method 600 will be discussed in conjunction with its performance on device 144 (a slave device in the present example), following the receipt of instruction message 500 from device 104 (the master device). For the purpose of this example performance of method 600, it will be assumed that device 144 performed method 200 previously, having detected a notification message similar to message 304 following receipt of email 300 from server 148 (it will be recalled that devices 104 and 144 are both associated with the email account maintained by server 104, and thus both receive emails from server 148). As will now be apparent, during the performance of method 200, device 144 would receive email 300, detect a notification message generated by the processor of device 144, and then determine that device 144 is not a master device. Device 144 would therefore proceed to block 212 and generate an alert according to alert settings stored in memory.

At block 605, device 144 is configured to receive instruction message 500. Having received instruction message 500, device 144 is configured to determine whether instruction message 500 matches any notification messages stored in the memory of device 144. For example, in keeping with the example performance of method 200 discussed above, device 144 can be configured to generate a hash of the event data contained in any stored notification messages, and compare the hash to identifier 504. In the present example, since device 144 also received email 300, the determination at block 610 is affirmative, since device 144 detected and stored a notification message corresponding to email 300 upon arrival of email 300 at device 144.

The performance of method 600 therefore proceeds to block 615. At block 615, device 144 is configured to generate an alert according to the alert parameter (or parameters) contained within the instruction message received at block 605. It is also contemplated that prior to generating the alert, device 144 can be configured to synchronize its clock with the clock of device 104 (that is, the current time maintained by processor 108) based on timestamp 508.

In the present example, therefore, device 144 is configured, having synchronized its clock with the clock of device 104, to flash an LED housed within device 144 every three seconds, starting at the time 7:18:28. As will now be apparent, devices 104 and 144 will therefore both generate the same alert, in synchrony.

If the determination at block 610 were negative, the performance of method 600 would instead proceed to block 620. Such a negative determination would result when device 144 has not stored any notification messages identifying the same event as the instruction received at block 605. For example, device 104, in some embodiments, may be associated with multiple email accounts, whereas device 144 is only associated with one of those accounts. Thus, when device 104 receives an email in connection with an account not associated with device 144 and sends an instruction message, the instruction message identifies an email which device 144 has not received (and indeed, will not receive).

At block 620, device 144 can be configured to simply ignore the instruction received at block 605. In some examples, however, device 144 can be configured to update any current alerts (that is, alerts currently being generated by device 144 for other notification messages). Rather than generating such alerts according to the parameters in the instruction received at block 605, however, device 144 can be configured to generate such alerts so as to be deliberately "out of phase" or otherwise in conflict with the alert parameters. For example, if the instruction includes the alert parameters discussed above in connection with instruction message 500, device 144 can be configured to adjust an existing, unrelated alert to flash every three seconds starting at 17:18:29.50. As a result, devices 104 and 144 will flash their respective LEDs at distinct times, so as to indicate that the flashing LEDs do not relate to the same event.

As discussed above, therefore, devices 104 and 144 are configured to synchronize their alerts when such alerts relate to the same events, and can additionally be configured to ensure that their alerts do not synchronize when such alerts do not relate to the same events. As a result, the alerts generated by devices 104 and 144 can indicate their relatedness (or lack thereof) to an observer such as the user of devices 104 and 144. This, in turn, can lead to reduced demands devices 104 and 144, as both devices do not need to be checked when their alerts are in synchrony.

Combinations and variations of the above are contemplated. For example, the alert parameters in instruction message 500 can identify an audible tone to be played by device 104 and device 144 (once device 144 has received message 500). In some variations, instruction message 500 can also include an identifier of which portion of the audible tone is to be played. Device 104 can therefore be configured to play a first portion of the tone (e.g. the first half of the tone) and to instruct device 144 to play a second portion of the tone (e.g. the second half) beginning at the time identified by timestamp 512.

As another example, as mentioned above, timestamp 508 can be omitted in some embodiments. In such embodiments, the alert parameters in instruction message 500 can identify an audible tone to be played by device 104 (and device 144, when instruction message 500 is received). Rather than instruct device 144 when to begin playing the tone, device 104 can be configured, at block 230, to play a first portion of the tone. Device 144, assumed to be in physical proximity to device 104, can detect the tone via a microphone, and play a second portion of the tone. As a result, clock synchronization can be omitted, and timestamp 508 is therefore not necessary.

It is contemplated that both devices 104 and 144 can maintain a hierarchy record which identifies slave devices. However, in some embodiments, only the master device maintains slave device identifiers, while the slave device (or slave devices) simply maintain flag 400 indicating that they are not master devices. In some embodiments, devices 104 and 144 can be configured to determine dynamically which device should be set as the master device, as will be discussed in connection with FIG. 7.

Figure 7:
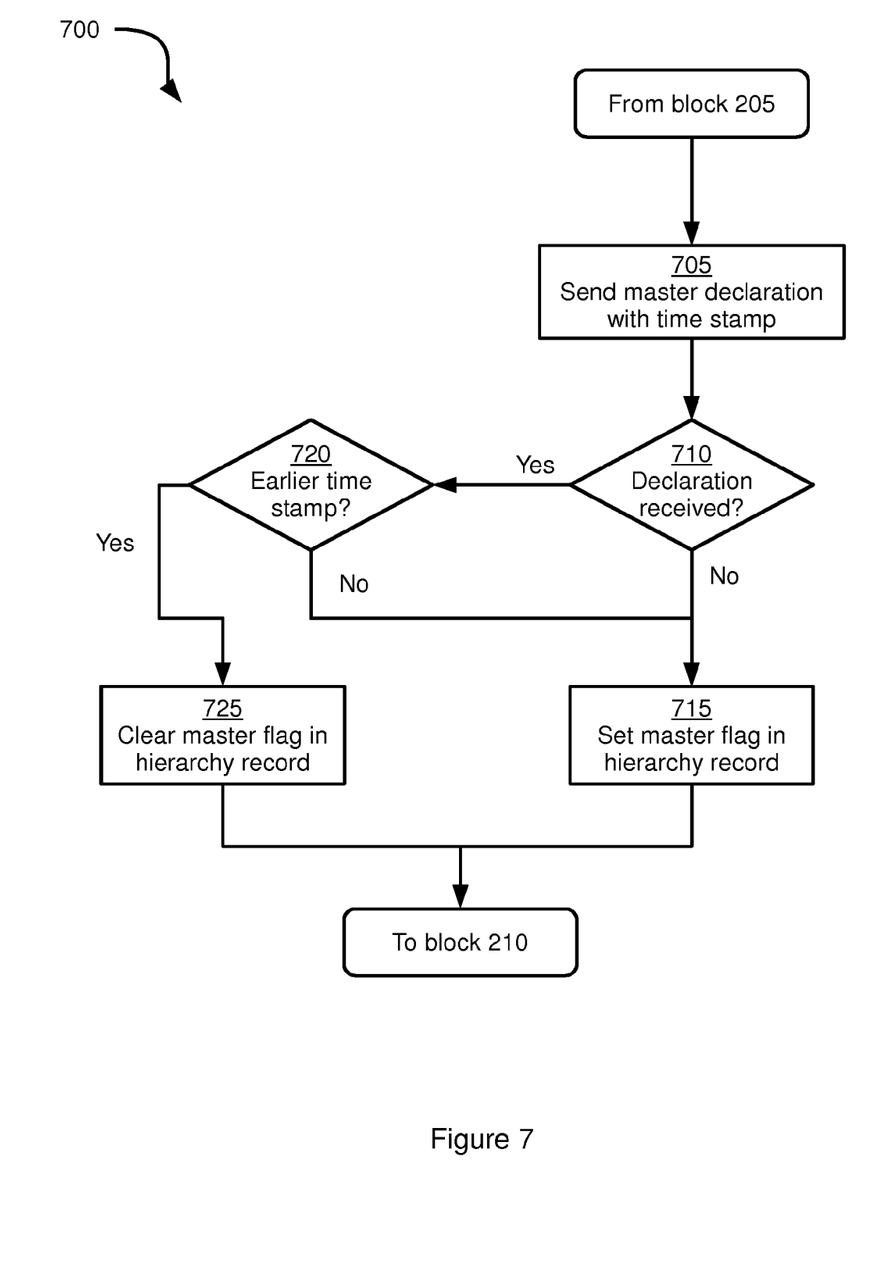
FIG. 7 depicts a method of setting one of the devices of FIG. 1 as a master device, according to a non-limiting embodiment.

Referring to FIG. 7, a method 700 is shown for setting one of devices 104 and 144 as a master device (and the other as a slave device) in response to the notification detected at block 205. In this example, both devices 104 and 144 maintain a hierarchy record 160 in memory. It is contemplated that both devices 104 and 144 are configured to perform method 700, however for the sake of illustration, only the performance on device 104 will be discussed. At block 705, having detected a notification message at block 205, processor 108 is configured to generate and transmit (via communications interface 132) a master declaration message, which includes an identifier of the detected notification message, and a time stamp indicating when the detection at block 205 occurred. The identifier and time stamp are also stored in memory 112. The declaration message thus identifies which notification message was detected, and when it was detected. The declaration message is sent to device 144.

At block 710, processor 108 is configured to determine whether a declaration message has been received from device 144. If no such declaration has been received within a predefined time period (for example, five seconds), the performance of method 700 proceeds to block 715. At block 715, processor 108 is configured to set master flag 400 to "yes" (or variants thereof, as discussed earlier) to indicate that device 104 is the master device. The performance of block 715 can include notifying device 144 that device 104 has become the master device.

If the determination at block 710 is affirmative, meaning that device 104 has received a declaration message similar to that discussed in connection with block 705 from device 144, performance of method 700 proceeds to block 720. At block 720, processor 108 is configured to determine whether the notification identified in the declaration received from device 144 was detected at device 144 earlier than at device 104. This is accomplished by comparing the time stamp in the declaration received at block 710 with the time stamp generated at block 705.

When the time stamp received at block 710 is the earlier of the two time stamps—or when device 104 does not have a detection time stamp and notification identifier in memory 112 corresponding to the declaration received at block 710, indicating that the declaration received at block 710 identifies a notification which has not been detected by device 104—processor 108 proceeds to block 725, at which flag 400 is cleared for setting device 104 as the slave device. A notification can be sent to device 144 confirming that device 104 is the slave device. On the other hand, when the time stamp received from device 144 is later than the time stamp generated at block 705, processor 108 proceeds to block 715.

In a further variation, rather than start time 512, instruction message 500 can include a start interval, indicating the length of time after timestamp 508 at which device 144 is to begin generating an alert. For example, instruction message 500 could indicate that the alert is to begin fifteen seconds after timestamp 508.

In a further variation, rather than beginning to generate an alert at block 212, a slave device can be configured to wait until an instruction is received from a master device.

Those skilled in the art will appreciate that in some embodiments, the functionality of processor 108 executing applications 152 and 156 can be implemented using pre-programmed hardware or firmware elements (e.g., application specific integrated circuits (ASICs), electrically erasable programmable read-only memories (EEPROMs), etc.), or other related components.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A method, comprising:
   storing, in a memory of a first communication device, an identifier of a second communication device and alert settings for an alert, the alert settings including a start time for the alert and a frequency for the alert;
   in response to detecting, at a processor interconnected with the memory of the first communication device, a first notification message via execution of a notification application, generating an identifier of the first notification message and a first timestamp representing a time the first notification message was detected by the processor of the first communication device and storing, in the memory, the identifier of the notification message and the first timestamp;

sending a first master declaration message from the first communication device to the second communication device, the first master declaration message comprising the first timestamp;

receiving, at the first communication device, a second master declaration message from the second communication device, the second master declaration message comprising a second timestamp representing a time a second notification message was detected at a processor of the second communication device;

in response to determining, at the processor of the first communication device, that the second notification message was detected at the processor of the second communication device after the first notification message was detected at the processor based on a comparison of the first and second timestamps:

storing a master flag in the memory of the first communication device to indicate that the first communication device is a master device;

retrieving, from the memory of the first communication device, the identifier of the second communication device and transmitting an instruction message to the second communication device, the instruction message further including the identifier of the first notification message and alert parameters corresponding to the alert settings stored in the memory for causing the second communication device to generate an alert for the first notification message according to alert parameters; and generating, at the processor of the first communication device, an alert for the first notification message according to the alert settings;

controlling an output device of the first communication device interconnected with the processor to output the alert for the first notification message at the start time for the alert.

2. The method of claim 1 wherein the instruction message includes a timestamp representing a current time.

3. The method of claim 2, further comprising: prior to transmitting the instruction message, obtaining an indication of the current time via a network.

4. The method of claim 1, wherein controlling further comprises controlling the output device to output the alert for the first notification message having the frequency for the alert.

5. A method, comprising:

detecting, at a processor of a slave device, a notification message via execution of a notification application;

receiving, at a processor of the slave device, an instruction message from a master device, the instruction message including a notification identifier of the notification message, a timestamp representing a current time maintained by a processor of the master device, and alert parameters comprising a start time for an alert and a frequency for the alert;

in response to determining, at the processor of the slave device, that the notification identifier included in the instruction message matches an identifier associated with any notification messages stored in a memory interconnected with the processor:

synchronizing a clock of the slave device with a clock of the master device based on the timestamp representing the current time maintained by the processor of the master device; and generating, via an output device of the slave device interconnected with the processor of the slave device, a first audible or visual alert according to the alert parameters to synchronize the first audible or visual alert with an alert generated at the master device; and, absent determining, at the processor of the slave device, that the notification identifier included in the instruction message matches an identifier associated with any notification messages stored in the memory of the slave device:

generating, via the output device, a second audible or visual alert for the notification message, the second audible or visual alert for the notification message being out of phase with the alert generated at the master device.

6. The method of claim 5, further comprising: absent determining, at the processor of the slave device, that the notification identifier included in the instruction message matches an identifier associated with any notification messages stored in the memory of the processor, ignoring the instruction message.

7. The method of claim 5 wherein determining includes comparing the notification identifier with the identifiers associated with the notification messages stored in the memory.

8. The method of claim 7 wherein the notification identifier and the identifiers are unique representations of respective subject fields.

9. A communication device, comprising:

a memory for storing an identifier of a second communication device, alert settings for an alert, the alert settings including a start time for the alert and a frequency for the alert and a notification application;

an output device;

a processor interconnected with the memory and the output device; the processor configured to:

responsive to detection of a first notification message via execution of the notification application, generate an identifier of the first notification message and a first timestamp representing a time the first notification message was detected by the processor of the first communication device and store, in the memory, the identifier of the notification message and the first timestamp;

send a first master declaration message to the second communication device, the first master declaration message comprising the first timestamp;

receive a second master declaration message from the second communication device, the second master declaration message comprising a second timestamp representing a time a second notification message was detected at a processor of the second communication device;

in response to determining that the second notification message was detected at the processor of the second communication device after the first notification message was detected at the processor based on a comparison of the first and second timestamps:

store a master flag in the memory to indicate that the first communication device is a master device;

retrieve, from the memory, the identifier of the second communication device and transmit an instruction message to the second communication device, the instruction message including the identifier of the notification message and alert parameters corresponding to the alert settings stored in the memory for causing the second communication device to generate an alert for the first notification message according to alert parameters;

generate an alert for the first notification message according to the alert settings; and, control the output device to output the alert for the first notification message at the start time for the alert.

10. The communication device of claim 9 wherein the instruction message includes a timestamp representing a current time.

11. The communication device of claim 9, wherein the processor is further configured to control the output device to output the alert for the first notification message having the frequency for the alert.

12. A communication device, comprising:
a memory for storing one or more notification messages;
an output device;
a processor interconnected with the memory and the output device, the processor configured to:
   detect a notification message via execution of the notification application;
   receive, from a master device, an instruction message including a notification identifier of the notification message, a timestamp representing a current time maintained by a processor of the master device, and alert parameters comprising a start time for an alert and a frequency for the alert;
   in response to determining that the notification identifier included in the instruction message matches an identifier associated with any of the notification messages stored in the memory:
      synchronize a clock of the slave device with a clock of the master device based on the timestamp representing the current time maintained by the processor of the master device; and
      generate a first audible or visual alert via the output device according to the alert parameters to synchronize the first audible or visual alert with an alert generated at the master device; and,
   absent determining, at the processor of the slave device, that the notification identifier included in the instruction message matches an identifier associated with any notification messages stored in the memory of the slave device:
      generate a second audible or visual alert for the notification message via the output device, the second audible or visual alert for the notification message being out of phase with the alert generated at the master device.

13. The communication device of claim 12, the processor further configured to: ignore the instruction message absent determining that the notification identifier included in the instruction message matches an identifier associated with any of the notification messages stored in the memory.

14. The communication device of claim 12, the processor configured to determine that the notification identifier included in the instruction message matches an identifier associated with any of the stored notification messages by comparing the notification identifier with identifiers of the stored notification messages.

15. The communication device of claim 14 wherein the notification identifier and the identifiers are unique representations of respective subject fields.

16. A non-transitory computer readable medium storing computer readable instructions executable by a processor of a first communication device for implementing a method comprising:
storing, in a memory of the first communication device, an identifier of a second communication device and alert settings for an alert, the alert settings including a start time for the alert and a frequency for the alert;
in response to detecting, at a processor interconnected with the memory, a first notification message via execution of a notification application, generating an identifier of the first notification message and a first timestamp representing a time the first notification message was detected by the processor of the first communication device and storing, in the memory, the identifier of the notification message and the first timestamp;
sending a first master declaration message from the first communication device to the second communication device, the first master declaration message comprising the first timestamp;
receiving, at the first communication device, a second master declaration message from the second communication device, the second master declaration message comprising a second timestamp representing a time a second notification message was detected at a processor of the second communication device;
in response to determining, at the processor of the first communication device, that the second notification message was detected at the processor of the second communication device after the first notification message was detected at the processor based on a comparison of the first and second timestamps:
   storing a master flag in the memory of the first communication device to indicate that the first communication device is a master device;
   retrieving the identifier of the second communication device from the memory of the first communication device and transmitting an instruction message to the second communication device for causing the second communication device to generate an alert, the instruction message including the identifier of the first notification message and alert parameters corresponding to the alert settings stored in the memory; and
generating, at the first communication device, an alert for the first notification message according to the alert settings; and,
controlling an output device of the first communication device interconnected with the processor to output the alert for the first notification message at the start time for the alert.

17. A non-transitory computer readable medium storing computer readable instructions executable by a processor of a slave communication device for implementing a method comprising:
detecting, at a processor of the slave device, a notification message via execution of a notification application;
receiving, at a processor of the slave communication device, an instruction message from a master device, the instruction message including a notification identifier of the notification message, a timestamp representing a current time maintained by a processor of the master device, and alert parameters comprising a start time for an alert and a frequency for the alert;

in response to determining, at the processor of the slave communication device, that the notification identifier included in the instruction message matches an identifier associated with any notification messages stored in a memory interconnected with the processor:
  synchronizing a clock of the slave device with a clock of the master device based on the timestamp representing the current time maintained by the processor of the master device; and
  generating a first audio or visual alert according to the alert parameters to synchronize the first audible or visual alert with an alert generated at the master device; and,
absent determining, at the processor of the slave device, that the notification identifier included in the instruction message matches an identifier associated with any notification messages stored in the memory of the slave device:
  generating, via the output device, a second audible or visual alert for the notification message, the second audible or visual alert for the notification message being out of phase with the alert generated at the master device.

18. The method of claim 1, wherein receiving at the first communication device, the second declaration message comprises receiving the first declaration message within a predetermined time period after sending the first declaration message.

19. The communication device of claim 9, wherein the processor is further configured to receive the second communication message within a predetermined time period after the first declaration message is sent.

* * * * *